United States Patent [19]
Lauer et al.

[11] Patent Number: 5,523,769
[45] Date of Patent: Jun. 4, 1996

[54] ACTIVE MODULES FOR LARGE SCREEN DISPLAYS

[75] Inventors: Hugh C. Lauer, Concord; Chia Shen, Pelham, both of Mass.

[73] Assignee: Mitsubishi Electric Research Laboratories, Inc., Cambridge, Mass.

[21] Appl. No.: 270,111

[22] Filed: Jul. 1, 1994

Related U.S. Application Data

[63] Continuation of Ser. No. 78,553, Jun. 16, 1993, abandoned.

[51] Int. Cl.$^6$ ............................................. G09G 5/00
[52] U.S. Cl. ............................................. 345/1; 345/903
[58] Field of Search .......................... 345/1, 2, 3, 112, 345/204, 903

[56] References Cited

U.S. PATENT DOCUMENTS

| | | | |
|---|---|---|---|
| 4,673,974 | 6/1987 | Ito | 358/108 |
| 4,745,404 | 5/1988 | Kallenberg | 340/717 |
| 4,800,376 | 1/1989 | Suga et al. | 345/127 |
| 4,833,542 | 5/1989 | Hara | 340/752 |
| 5,361,078 | 11/1994 | Caine | 345/2 |

*Primary Examiner*—Richard Hjerpe
*Assistant Examiner*—Xiao M. Wu
*Attorney, Agent, or Firm*—Robert K. Tendler

[57] ABSTRACT

High resolution modular large screen displays which can require tens of minutes to display or "paint" an image are updated in real time through the use of active modules, each having its own display device, display driver, processor, memory and interfacing. Communication channels are provided between modules themselves as well as between the modules and a network interface that distributes the video source material in parallel to the modules. The modular approach coupled with the use of active modules permits significant communication reduction that in turn permits real time image production across large areas due to the use of parallel data paths to the display memory distributed across the modules, and through the transmission of structured data, including compressed images, compressed video, sampled data and graphics primitives, permitted by the provision in each module of a processor which converts structured data to images. The use of modules with internal processing also permits driving displays of differing configurations, such as oblong, trapezoidal and even circular displays, or even driving displays with irregular surfaces. As a further result of using active modules, increased speed or flexibility is achieved in part due to computer processing power which may be directed only to those sections of the display that are actively addressed. As an additional feature, the active modules may be initialized by software agents, with formatting and other display parameters being transparent to the format or pixel density of the original image.

1 Claim, 10 Drawing Sheets

ACTIVE MODULES FOR LARGE SCREEN DISPLAYS

This is a continuation of application Ser. No. 08/078,553 filed on Jun. 16, 1993, now abandoned.

FIELD OF INVENTION

This invention relates to high resolution large panel displays and more particularly to the utilization of an array of active display modules in which each module is provided with a processing unit to permit rapid painting and updating of the display regardless of display size or pixel density.

BACKGROUND OF THE INVENTION

Stadium size displays have been used in the past to present video information to audiences. However these displays are in general low pixel density devices meant for viewing at large distances. As such, these displays need only be low resolution devices.

On the other hand, there exists a need for large megapixel high resolution displays, viewed within a few feet for applications as diverse as CAD/CAM design, motion picture editing, map display, blueprints, white boards and detailed control panels. These appreciations require more than the multiple TV monitor approach used for advertising or auditorium use because of the detail that must be represented in a single field of view. For instance, a 6000×2000 pixel display of 12 megapixels is required to permit detailed editing of motion pictures in a single field of view. In order to obtain enough definition, one must dramatically increase the pixel density and be able to quickly address this massive number of pixels in real time.

While megapixel displays are presently feasible, one of the major problems in the display of images across such large high pixel density displays has been the difficulty in driving these displays in real time. This is due to the large amount of data which must be transmitted to drive all of the display. For the above-mentioned 2,000×6000 pixel display of 2 ft.×6 ft., with 24 bits per pixel, 288 Mbits are required per image. For full motion video, transmitted pixel by pixel at 30 frames per second, 8.64 Gbits per second communication must be provided between source and display. However, the fastest communication I/O bus can transmit only 0.2 Gbits per second.

Because of bus limitations, when such a large wall-size display is to be driven by a central processing unit (CPU) which serves as a video source generator for the display, it takes tens of minutes to provide or "paint" the image across the display. This is because all of the individual pixels are addressed through a speed-limited network or communications channel between the source of video images and the passive modules used to drive different segments of the display.

Note that passive modules include only a display element and driver. Such passive modules are described in U.S. Pat. No. 5,067,021. Other low pixel density modular display systems are described in U.S. Pat. Nos. 5,129,028; 5,109,348; 5,107,534; 5,057,739; 5,011,277; 4,978,952; 4,935,880; 4,901,155; 4,874,227; 4,866,530; 4,833,542; 4,772,942; 4,769,680; 4,760,388; 4,720,803; 4,410,887; and, 4,384,279.

Driving all of the above modular displays is painfully slow due to the limited bandwidth of the serial buses utilized. In general, these passive modules are to be driven from a central processor or video source generator which routes video material or information to the modules responsible for various segments of the display over a so-called VME bus. Since none of the modules have associated processors and are thus passive in the process, the result is that there is a data bottleneck at the bus. With all of the computing power carried at the central processor, there is a massive amount of raw data which must be transmitted over the conventional bandwidth-limited VME bus. Noting that the numbers of multiplications per second to "paint" an image across such a large high pixel density display is in the billions for full motion video, maintaining and updating the display through current bus structures and passive modules is unacceptably slow. For instance, in one application, it takes over 24 minutes to provide an image over the above 6 ft.×2 ft. modular display due to the bandwidth limitations of the communication channel.

By way of further background, in terms of how images are normally generated, image-generating software programs running on a CPU typically convert structured data representing the visual information being displayed into pixels, with each pixel being the digital representation of a single, small spot of light on the display.

The structured data includes the digital representations of text; lines, arcs, polygons, and other graphical objects; and digital encoding of images captured by cameras, called sampled images.

Pixels generated at the CPU or other video source generator are typically written to a frame buffer, a designated portion of computer memory. A device controller is interposed between the frame buffer and the display device which reads pixels from the frame buffer and converts them to a form suitable for transmission to a display device such as LCD display or a projector. The device controller repeatedly reads all of the pixels of the visual information being displayed, thereby "refreshing" the display device in order to present a persistently visible image. In normal computer display systems, the device control reads all pixels approximately 60 to 72 times per second.

The frame buffer is usually either a designated region of ordinary computer memory, a separate bank of computer memory, or a special kind of computer memory device such as Video-RAM.

When the generator of visual information wishes to change the image or information seen on the display, it generates new structured data. Software programs in the CPU then convert this new data to pixels and write them to the frame buffer. Because the device controller for the display is repeatedly reading the frame buffer to refresh the display, the new visual information is guaranteed to be displayed within one refresh cycle.

The amount of computation required to convert the new structured data to pixels is proportional to both the number of pixels in the area to be updated and the complexity of the visual information being displayed. The complexity of the visual information is based on the number of colors, and the degree of sophistication of the graphic objects.

For straight text and a 12 megapixel display, considering a computer with a CPU capable of 10 million instructions per second, were it not for bandwidth limitations of the communications channel, with a display of twelve million pixels, a frame buffer capable of holding pixels of eight bits each can paint the entire area of the display with text in approximately 2–4 seconds.

With respect to colored images, this requires approximately 4 multiplication operations per pixel per color component of the resulting image. Thus, painting a sampled image with three color components (red, green and blue) into an area of twelve million pixels requires 144 million multiply operations. This takes approximately 14 seconds to cover a 12 megapixel screen with the sampled image. The above assumes a 10 million instruction per second machine.

Note that for full motion video, one must paint an image every 1/30th of a second. Thus, the above system which can paint only one frame every 14 seconds is clearly insufficient. The limiting factor is not ultimately computer power but rather bus bandwidth. It is possible to provide faster computers which run at many more million instructions per second to reduce painting to the order of a second or less. However, present bus structure prevents taking advantage of such computational power. For instance, considering that video information consists of frames at rates of approximately 30 frames per second, with each frame being a sampled image, to display full motion video information in an area of 12 megapixels requires 30 times the number of operations of one sampled image, or 4.32 billion operations per second. This translates into data rates over a bus of 1.08 Gbytes/sec. Assuming such computational power, this is far beyond the capability of any present bus structure, i.e., 0.1–0.2 Gbytes/sec.

In an attempt to overcome the lengthy amounts of time required to update a display, accelerators have been provided, which off-loads from the CPU some of the computation required to paint graphics and sampled images. However, accelerators do not solve the problem of transmitting massive amounts of data to a high pixel density display. Rather, accelerators divide up the computational tasks prior to communicating the results to passive display modules over a conventional VME bus, which still remains the bottleneck.

Moreover, accelerators are specialized devices with their own graphics drawing packages to be able to paint lines on a single monitor. There is no intermodule communication to be able to distribute processing tasks between monitors or modules. Nor is there any attempt to accommodate increased numbers of pixels for better resolution. Note, as far as networks are concerned, it is possible to separate the generator of visual information from the computer system on which it is displayed. The generator transmits structured information, e.g. text, graphic information (lines, arcs, polygons, etc.), sampled images, and compressed images, over a computer network to another computer workstation. At the second computer, called the server, the CPU converts the structured data to pixels.

However, this again does not solve the problem of driving a large area display from the server, because the massive amount of pixel data must nonetheless be transmitted from the server to the display over a bandwidth limited bus.

SUMMARY OF THE INVENTION

In order to achieve the generation of images in real time across high pixel density large wall-size displays, what is provided is an array of active modules, with each module having its own display device, display driver, processor, memory and interfacing. Because of its internal processing capability, each module is equipped to take data and either convert it into real pixels for presenting a portion of the image to be displayed or permit routing of data to other modules. The routing of data from module to module is achieved through communication buses which interconnect the modules to permit intermodule communication. In one embodiment, data from the video source is coupled to a network interface associated with the center module. From this module data is routed in parallel through the module/communication bus network to the requisite modules for the production of the overall image.

In order to achieve the required speed in a preferred embodiment, the data bus coupled to the modules transmits structured data. Structured data refers to a reduced data set representing the image and includes digital representations of text, lines, archs, polygons, and other graphical objects as well as digital encoding of images captured by cameras or other devices, which are called sampled images. Digital compression techniques also produce structured data, with the structured data resulting from the compression.

In order to take advantage of structured data, one of the active modules, preferably at the center of the display, is provided with an interface which directs the incoming structured data to the requisite active modules through the intermodule communication buses. This is effectively done in parallel, with the active modules converting the routed structured data to appropriate physical pixels for each segment of the display. Thus, data is routed by the intermodule bus structure to modules whose computational horsepower is then used to recreate the image.

Note that each of the modules is active in the sense that each is provided with a processor. Boundary problems between modules are eliminated through utilization of one or more presently available techniques, with inter-module interconnects achieving image format and manipulation. Using modules and interconnect communications to create an image effectively permits formatting and image processing at each individual module to translate between original pixel density or display parameters such as size and shape and those of the particular display.

The functions of the active modules include converting source material into pixels for parts of the display surface, with the module translating logical pixels into physical pixels. As used herein, a "logical surface" refers to a mathematical surface having "logical" pixels which must be converted into physical pixels by the modules.

Module processing also is used to automatically convert the pixel density of the source material to the pixel density of the actual display. Further functions of the module include forwarding communication from module to module, traffic control of source material to other modules and management of input devices such a keyboards, touch pads or mice as well as communication back to the generators of source material.

In one embodiment, the active modules and their communications channels create a single logical surface capable of eliminating boundary problems while at the same time providing reformatting functions so that source material can be displayed independent of the display parameters. Thus, the utilization of so-called "smart" or active modules and communications channels effectively isolates the generation of the source material from pixel density and display considerations including interpolation and reformatting, with formatting and other algorithms being carried by the processing performed by the modules themselves. The Subject System is therefore capable of maintaining and real time updating large panel displays in excess of hundreds of megapixels, or concommitally by real time driving smaller displays with increased pixel density.

Moreover, the modules can be configured in any arrangement or orientation to present displays of different sizes and shapes without regard to physical limitations of individual display devices; or to present a wide variety of windows with a range of size, content and image complexity.

More particularly, one way to achieve a display of $10^7$–$10^8$ pixels is to arrange 10 to 100 displays, each with $10^6$ pixels, in a grid or other geometric pattern. Each individual unit or a subgroup is arranged to have its associated module with its own integral processor and memory responsible for font and graphics rendering, image processing, video decoding, clipping and coordination with adjacent modules. The entire array is connected directly to a data network so that it appears to an application as a single, seamless device somewhat like an X-terminal, but capable of a much higher data rate. To the user, the functioning of the modules is transparent. It is a feature of the Subject Invention that applications need not be aware of the parallelism by which the array of modules is driven, but instead a protocol such as X is used to display information in logical windows of canonical size. Once the information reaches the display, it is routed internally to the appropriate processors within the modules, where it is scaled and displayed. As with the X-window system, the arrangement of windows is independent of the application.

As an example of the potential reduction in communication requirements consider sustaining the above-mentioned 2K×6K=12M pixel screen with live video at 30 frames per second. It can be shown that the above appreciation requires a data rate of 1.08 Gbytes per second. In the case of active display modules, "decompression chips" may be included as part of each processor within a module. This permits the transmission of structured data and/or compressed video frames. The ability to process structured data results in a 1.5 order of magnitude reduction in data rate in that the 1.08 Gbytes per second is reduced to 0.03 Gbytes/sec, still slightly above present bus capacity. Additional compression techniques can reduce the data rate by a factor of at least 30. This combined use of structured data and compressors reduces the data rate to 0.001 Gbytes/sec., e.g., 1 Mbit/sec, which is clearly within the capability of standard VME buses. Moreover, compressed video frames of much smaller size than the actual screen size can be transmitted from the source to further reduce the data rate, with the processors in the active modules performing the "resizing" image operations in parallel to paint a full-screen size video.

BRIEF DESCRIPTION OF THE DRAWINGS

These and other features of the invention will be better understood taken in conjunction with the Detailed Description in conjunction with the Drawings of which.

DETAILED DESCRIPTION

Figure 1A:
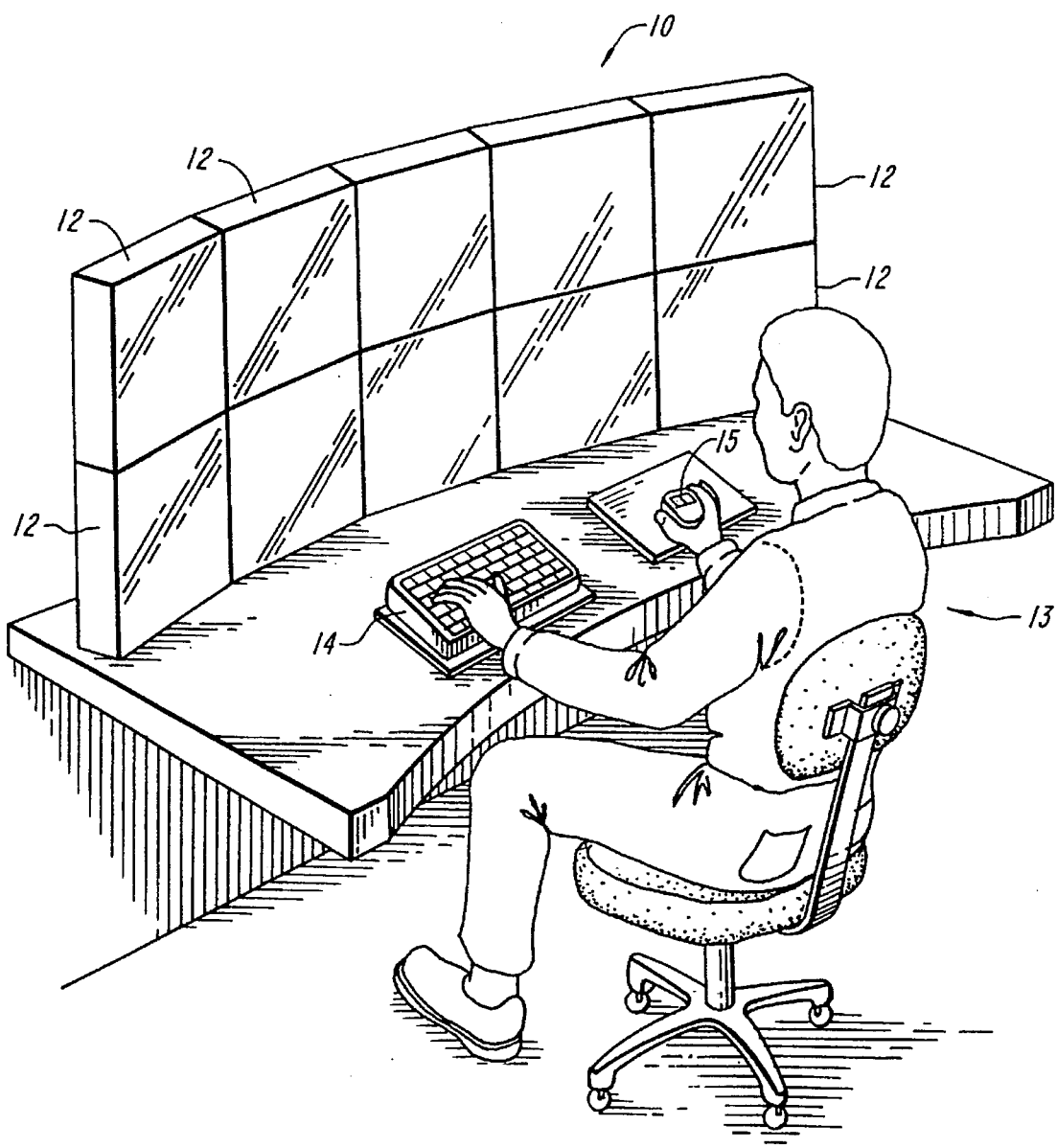
FIG. 1A is a diagrammatic representation of a large screen display of the type which may take many tens of minutes to refresh or update.
Figure 1B:
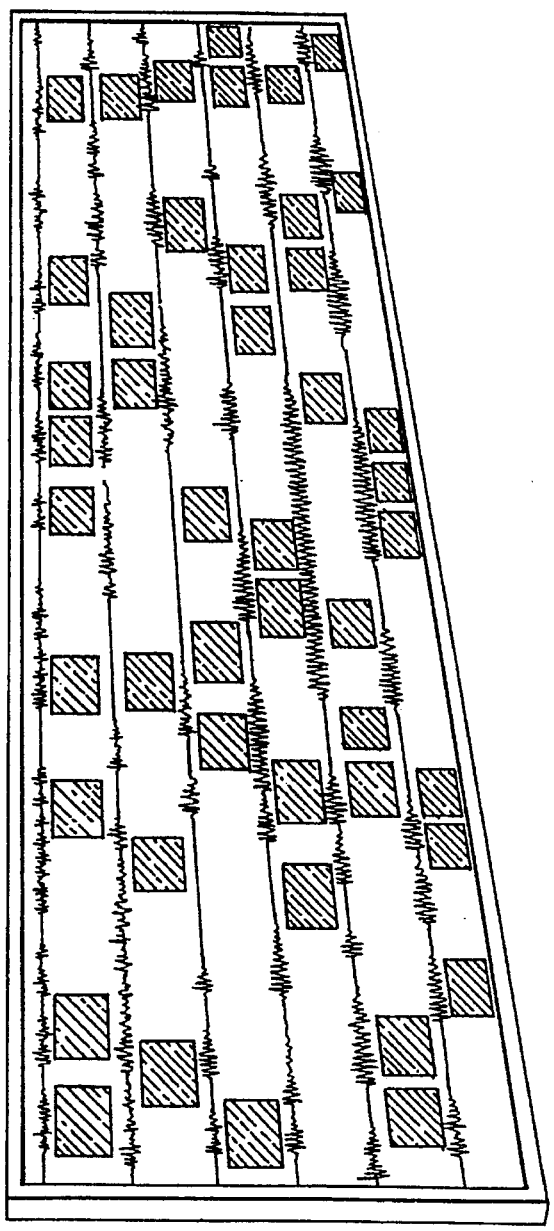
FIG. 1B is a diagrammatic representation of a continuous image to be provided by the display of FIG. 1A.
Figure 1B:
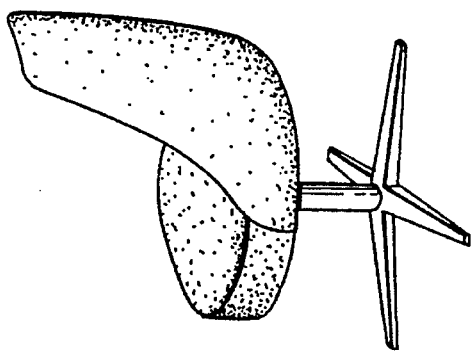

Referring now to FIG. 1, in order to provide a modular megapixel display for use for video editing as an example, it is desirable to have a modular display 10 which in the illustrated embodiment is a display of approximately 6 ft.×2 ft. that incorporates modules 12 arranged in a slightly curved fashion for ease of viewing. The modular display arrangement permits the display of images across the display to a workstation position some two to four feet away, where an operator 13 sits in front of the display with a keyboard 14 and a mouse 15 to control the editing process. By way of illustration, the images shown in the diagram of FIG. 1B may be clips of a motion picture which is to be edited, along with a visual representation of the sound track for these visual images.

In the past with passive modules, in order to paint such a full image across the entire display, it would take a full 24 minutes due to bus limitations. Obviously, this is much too slow to permit real time video editing.

Figure 2A:
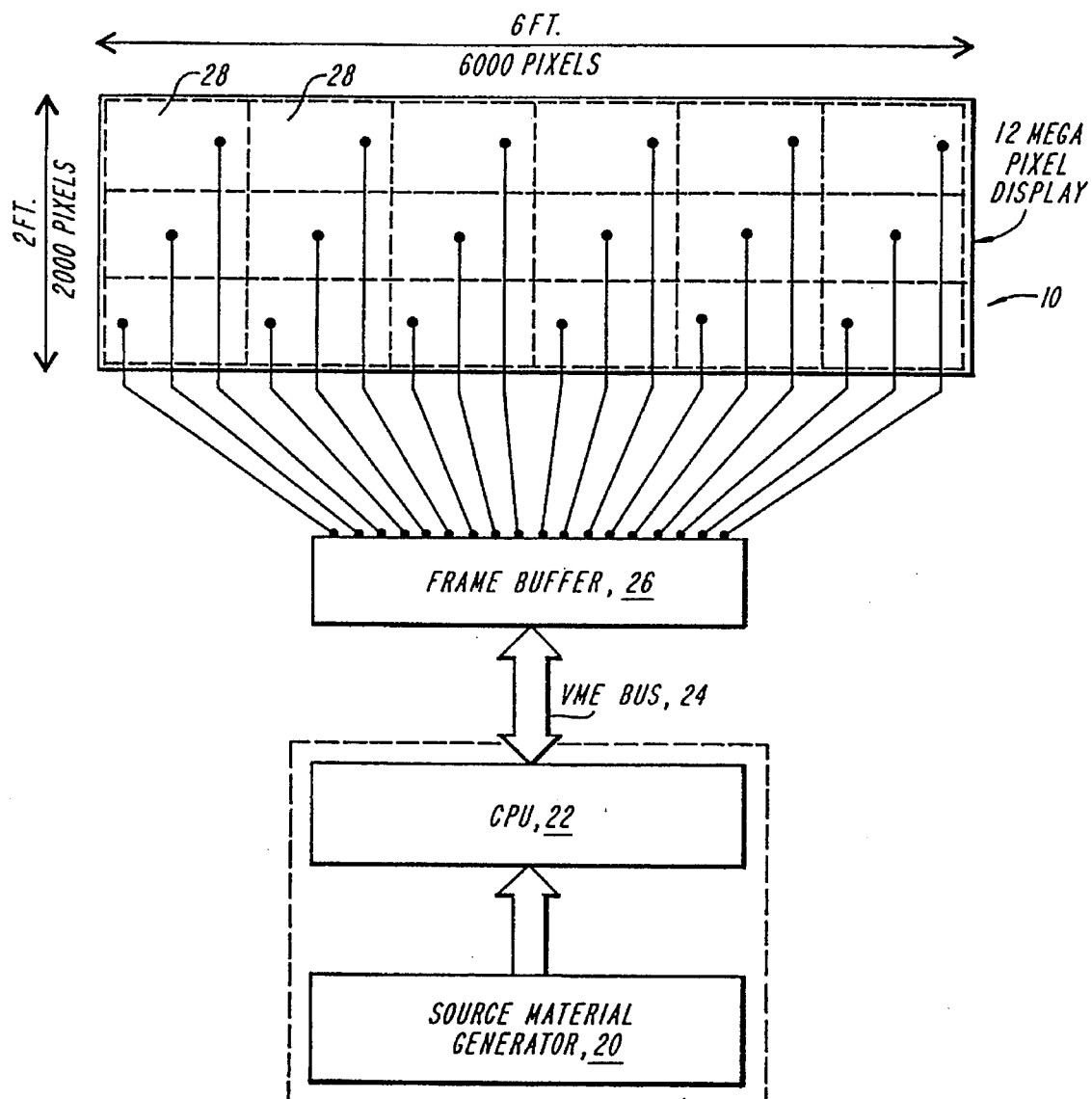
FIG. 2A is a schematic and block diagram of a prior art passive module system for driving the type of display pictured in FIG. 1.

In order to explain the difficulty in providing real time images on megapixel displays and referring now to FIG. 2A, in the past the images were painted across a passive module display through the use of a generator of source material 20 coupled to a CPU 22 that drove a VME bus 24 to a frame buffer 26 which distributed the pixel information to each of the passive modules 28 making up a display 10. Each of the prior art modules was merely a passive device which included a display driver and display device. It will be appreciated that there was no intelligence associated with any of the passive modules.

The result was that any intelligence had to be supplied by a CPU removed from the display, with raw pixels transmitted over VME bus 24. As mentioned hereinbefore, this type of serial bus was capable of a maximum of 200 megabits per second, which was clearly insufficient to be able to paint, refresh or update large scale modular displays in anything close to real time. Even with massively parallel processing, there still existed a bottleneck between the parallel processing device and the individual passive modules which made up the display.

Figure 2B:
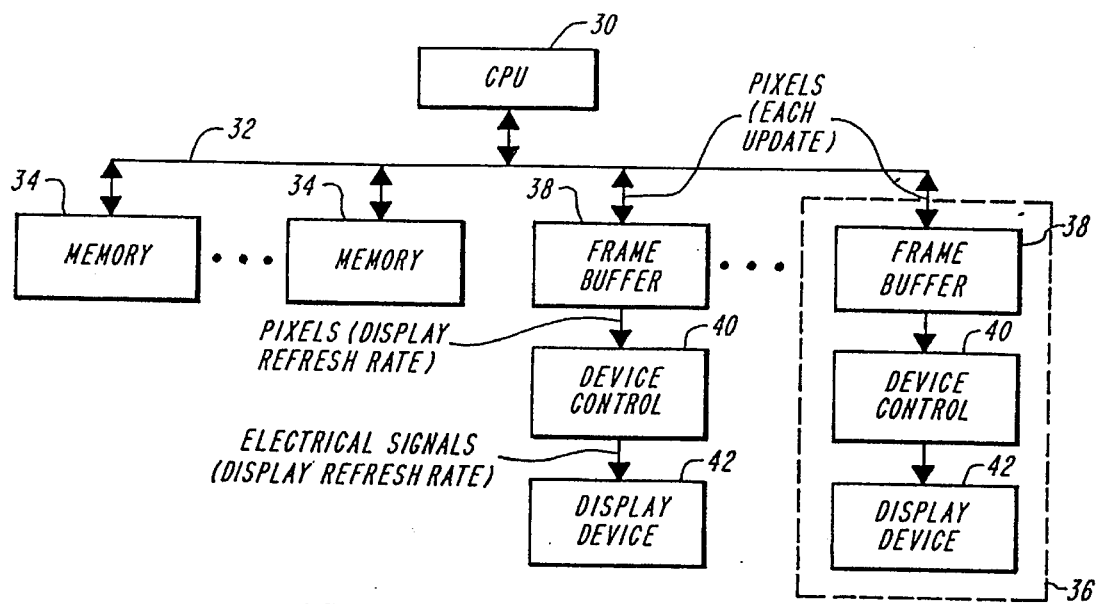
FIG. 2B is a block diagram showing a prior art system, utilizing passive modules for the driving of modular displays, indicating a bus structure that is bandwidth-limited.

Referring to FIG. 2B, the situation with respect to prior art displays can be explained as follows. Assuming a CPU 30 driving a standard VME bus 32 with memory 34 coupled to the bus, and assuming that each passive module 36 includes a frame buffer 38, a device control 40, and a display device 42, then the traditional way of painting on modular displays is to provide pixels with each update transmitted by the VME bus to each of the frame buffers. Note, the VME bus transmits actual logical pixels that are provided to the frame buffers with each update cycle. Pixels are then provided from the frame buffer to a device control unit 40 at the display refresh rate, with the output of device control unit 40 being electrical signals which are delivered to the display device, again at the display refresh rate.

However, VME bus 24 can usually transmit only 80 megabits per second, or at most, 320 megabits per second. What is necessary for full frame video is at least 6.9 gigabits per second. As can be seen, the present serial bus structure is woefully inadequate for real time video displayed across large canvasses.

More particularly, it will be appreciated that software programs running on a CPU takes an image and provides information that defines each pixel, with each pixel being the digital representation of a single, small spot of light on the display.

As illustrated in FIG. 2B, pixels are written to a frame buffer which is a designated portion of computer memory. The device control for the display device is an electronic circuit which reads pixels from the frame buffer and converts them to a form suitable for transmission to a display device. The device controller repeatedly reads all the pixels of the visual information being displayed, thereby "refreshing" the display device in order to present a persistently visible image. In normal display systems, the device control reads all pixels approximately 60 to 72 times per second.

The frame buffer may comprise a designated region of ordinary computer memory, a separate bank of computer memory, or a special kind of computer memory device, such as a Video-RAM. When the generator of visual information wishes to change the image or information seen on the display, it generates new data. Software programs in the CPU then convert this new data to pixels and write the pixels to the frame buffer. Because the device controller for the displays repeatedly reads the frame buffer to refresh the display, the new visual information is guaranteed to be displayed within one refresh cycle. The process of converting structured data to pixels is called "painting".

The amount of computation required to convert the new data to pixels is proportional to both the number of pixels and the area to be updated and the complexity of the visual information being displayed. The complexity of the visual information depends on the number of colors, the degree of sophistication of the graphic objects, and other image related data.

It will be appreciated that efficient interpolation algorithms to convert a sampled image to the pixel density of a particular device can require approximately four multiplication operations per pixel per color component of the resulting image. Thus, painting a sampled image with three color components (red, green and blue) into an area of one million pixels requires approximately twelve million multiply operations, with the painting taking more than one second. Video information consists of frames at rates of approximately 30 frames per second. Each frame is a sampled image. To display video information in an area of one million pixels requires 30 times the number of operations of one sampled image or 360 million operations per second. For large screen displays, as mentioned above, 12 to 20 million pixels are required. This obviously multiplies the amount of computation necessary and also the amount of information which must be transmitted over a bus to the display.

Figure 2C:
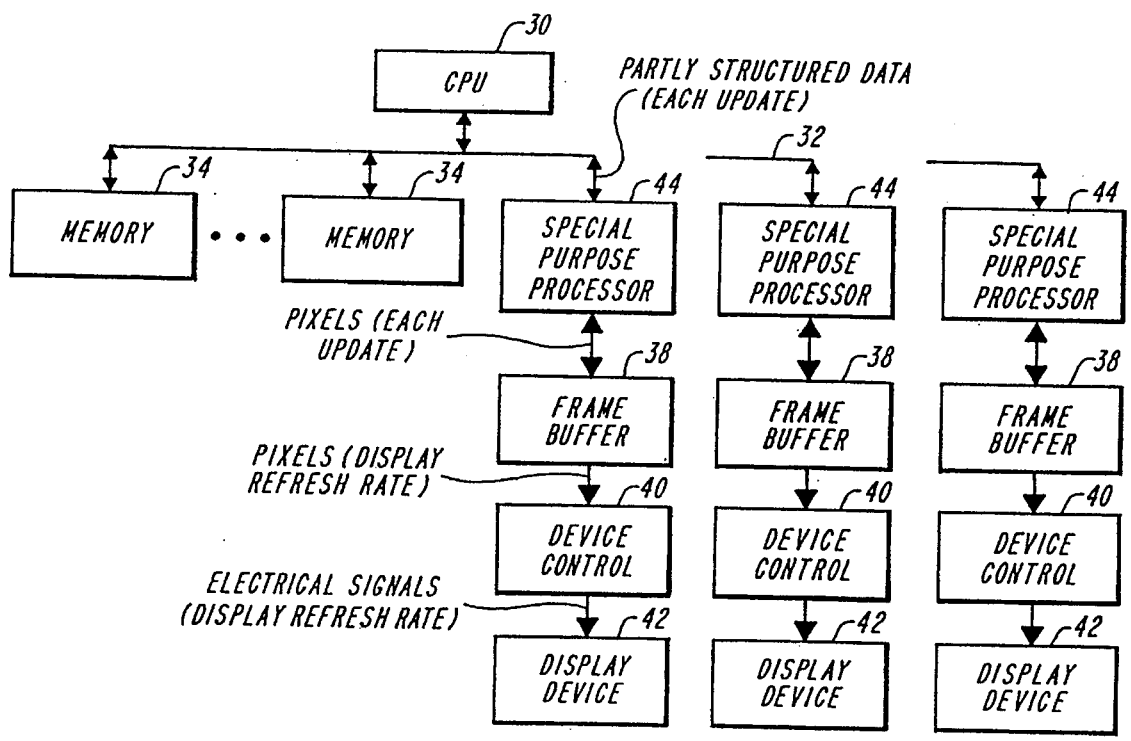
FIG. 2C is a block diagram illustrating a passive module system utilizing accelerators to increase speed within each module, but without improvements of bus capacity, bandwidth or speed.

Referring to FIG. 2C, assuming that an accelerator in the form of a special purpose processor 44 is interposed between bus 32 and frame buffer 38, then there are certain efficiencies that can be obtained.

However, the problem with the utilization of accelerators is that they are primarily intended to draw complex or complicated graphics. They are not intended to increase the number of pixels for increasing resolution or detail which involves much more traffic across buses. Moreover, there is no communication between accelerators which could result in real time pixel drive.

In summary, to overcome the lengthy amounts of time required to update a display, accelerators have been provided, with the accelerator being a special purpose electronic mechanism, containing its own internal processor, which off-loads from the CPU some of the computation required to paint the graphics and sampled images. With the utilization of accelerators, the CPU still has the primary responsibility for painting the visual information into the frame buffer; and this is done over the aforementioned VME bus which presents a bottleneck to the flow of data.

Figure 3:
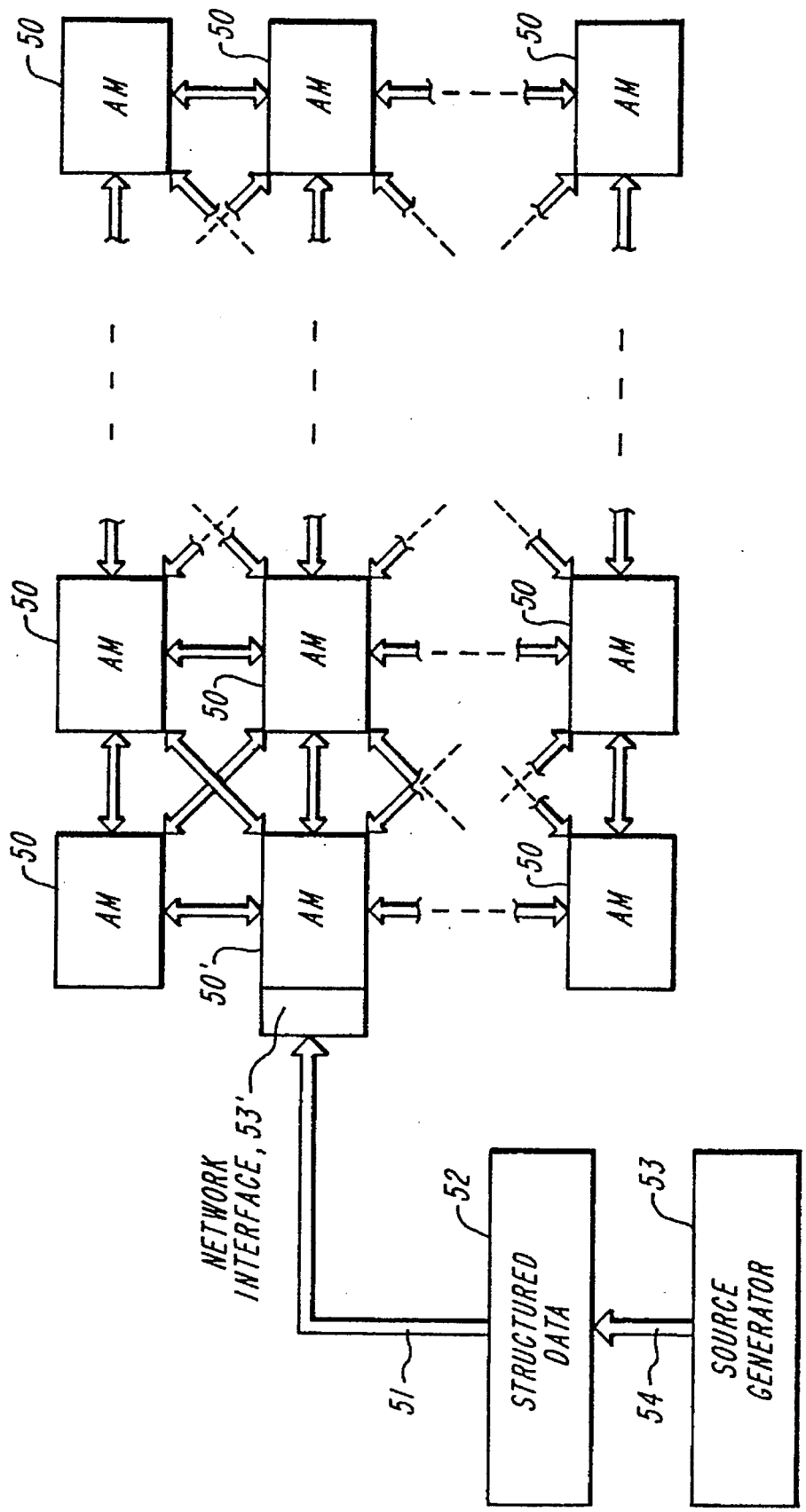
FIG. 3 is a block diagram illustrating the utilization of active or smart modules and interconnecting communications buses, along a data bus which is interposed between the source of video material and the communications interface for the modules, illustrating the transmission of only structured data for processing by the modules.

Referring to FIG. 3, rather than providing accelerators, active or smart modules 50 are provided in an array, with a central module 50' being provided with structured data over a high bandwidth channel 51 from a structured data generator 52. Each of the active modules has its own processor so that only structured data need be sent to this active module. In one embodiment, the structured data is transmitted at a rate of 2.4 Gbits per second. Raw image data is received from a video source generator 53 over bus 54, with generator 52 creating the required structured data.

It will be appreciated that one of the active modules, namely module 50', is provided with a network interface 55 to which the structured data for the entire array is coupled. It is the purpose of network interface 55 that it route the structured data to the appropriate modules, with the appropriate modules then converting the structured data into logical pixels and then into physical pixels for the display.

Figure 4:
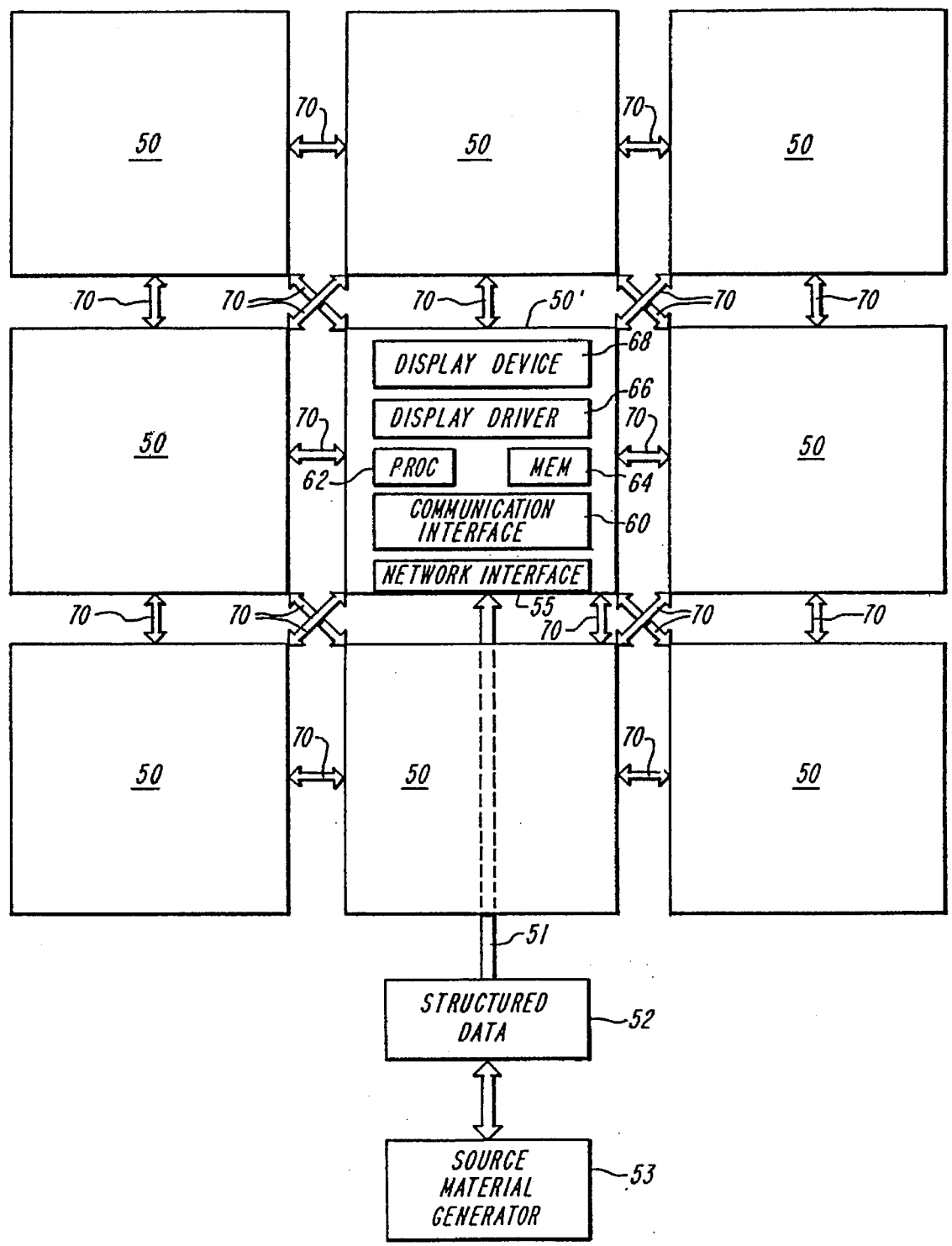
FIG. 4 is a block diagram illustrating the architecture of the active or smart modules, in which each module is provided with an interface, a processor, a memory, a display driver and a display device; and with structured data being provided over the bus between the source generator and communications interface for the display.

Referring now to FIG. 4, generator 53 is shown coupled to structured data generator 52, with high bandwidth channel 51 coupled to network interface 55. As above, the network interface is associated with active module 50'. For convenience, module 50° is located at the center of the display.

Each of the active modules 50 includes a communication interface 60, a processor 62, an internal memory 64, a display driver 66, and a display device 68. The data to be transmitted between modules is provided from module 50' via data buses 70 between the modules in a parallel or quasi-parallel manner so that the structured data can be dispersed amongst the appropriate modules for further processing. The network interface provides the routing required such that the appropriate data is transmitted from the central module to the outlying modules, addressed appropriately to activate those modules which are actively involved in creating the particular segment of the image to be displayed.

The key element of the active module is the processor which can perform one or more of the following functions:

Image processing, Interpolation, Splitting, Anti-aliasing, Resizing, Reformatting the display mode, and Translate/rotate operations.

It will be appreciated that communication economies are affectuated by the utilization of communication between the modules. As illustrated, this communication is accomplished via buses 70 between modules so that the computational power in each of the modules may be appropriately utilized. The types of information transmitted over buses 70 include structured drawing commands, such as commands for text, graphics, lines, polygons, sampled images, and compressed sample images. Also transmittable over buses 70 are logical pixels suitable for interpolation or in fact the physical pixels which are necessary in order to assure that the display driver drives a given display device in an appropriate fashion. Additionally, window commands can be applied over buses 70 as well as font information.

Figure 5:
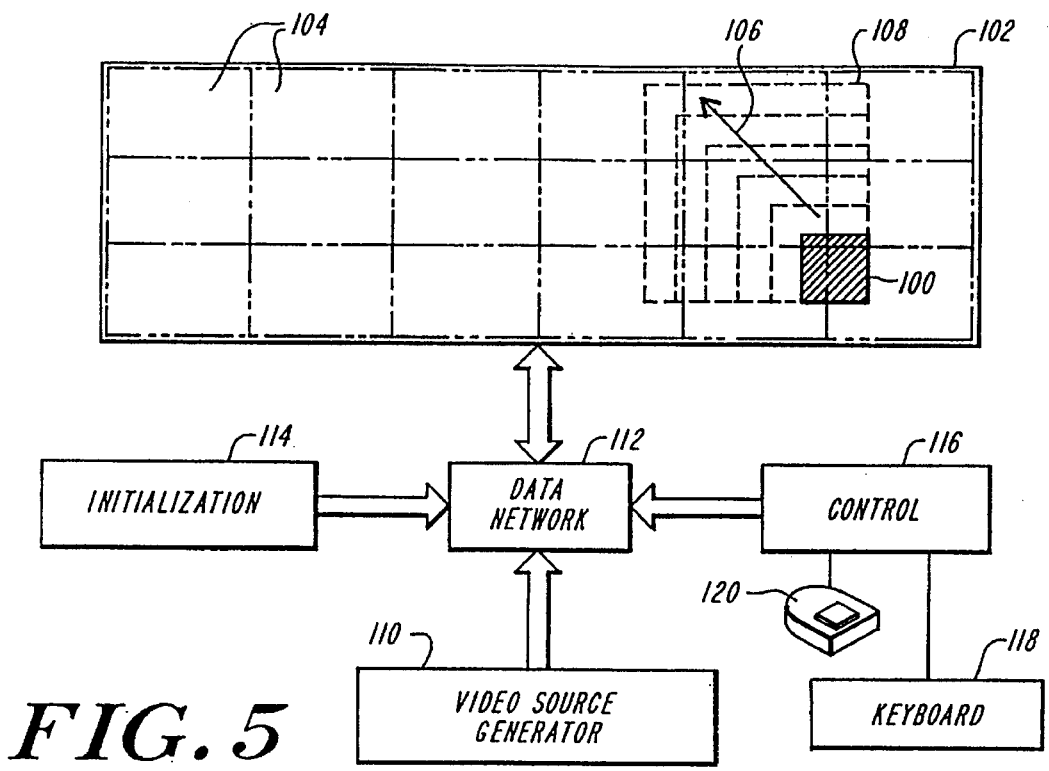
FIG. 5 is a diagrammatic representation of the utilization of smart modules in the real time expanding of an image across modular boundaries in a large panel display scenario.

Referring now to FIG. 5, in one embodiment an image 100 on a modular display 102 having active modules 104 can be expanded in the direction of arrow 106 as illustrated by the dotted lines 108 so that either a zoom or unzoom feature can be provided in real time. It will be appreciated that the reason that the expansion or contraction of the image across the modules can be done in real time has to do with the processing capability of the active modules. Thus, when a video source generator 110 applies its output to a data network 112 which is in turn applied to modular display 102, and with appropriate initialization 114 under control of control unit 116 either via keyboard 118 or mouse 120 image 100 can be made to expand or contract as illustrated.

Figure 6:
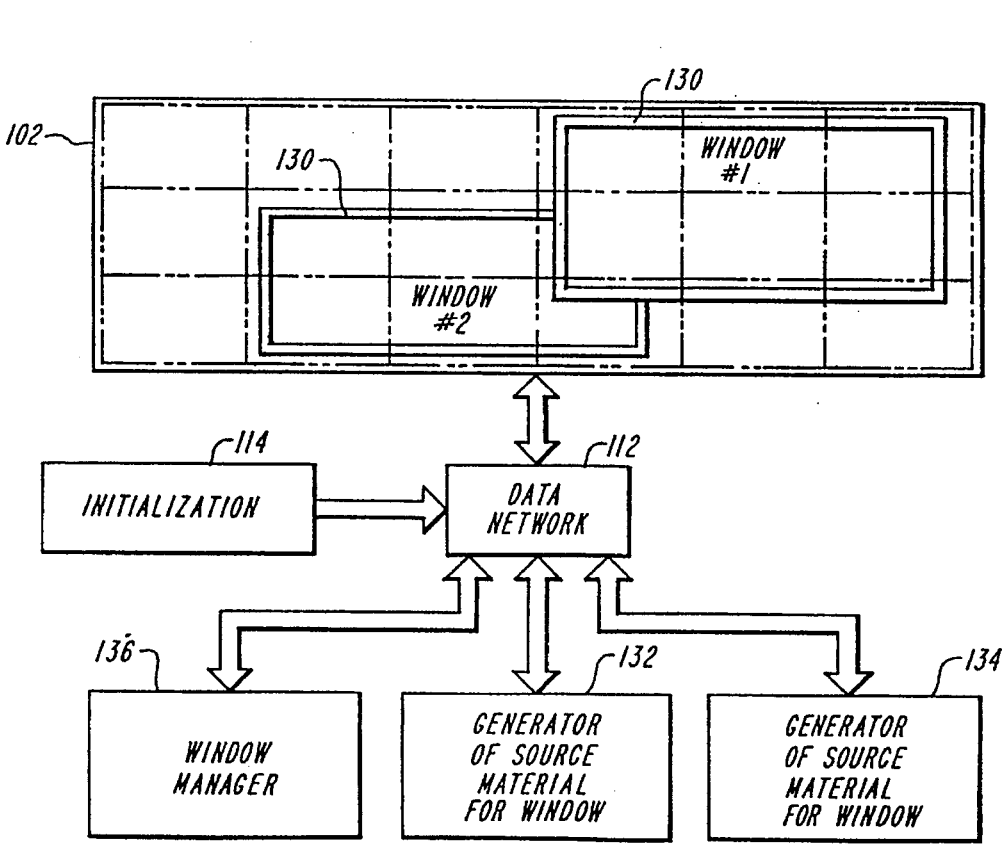
FIG. 6 is a diagrammatic illustration of the utilization of the active module display technique, assisting in the presentation of windows across a large panel display.

Referring now to FIG. 6, given a similar large screen display 102 windows 130 can be displayed as illustrated utilizing a generator 132 of source material for Window 1 and a generator 134 of source material for Window 2. A window manager 136 is also utilized, with the outputs of generators 132 and 134 being applied to data network 112 along with the appropriate initialization 114.

In both FIGS. 5 and 6, initialization refers to the provision of software agents which will initialize the modules to perform the indicated functions. The initialization messages are interfaced to each module to reconfigure the module to be able to do the particular task or application.

Figure 7:
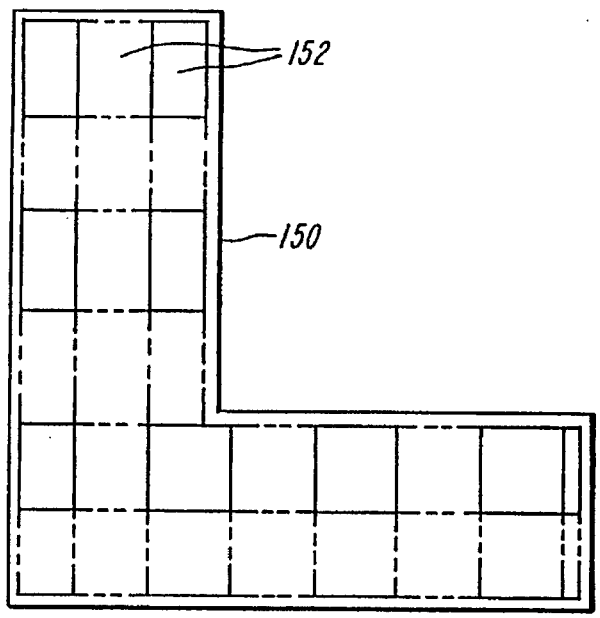
FIG. 7 is a diagrammatic illustration of an L-shaped active module display, with the internal processing of the active modules being responsible for the ability to paint across this geometry.

Referring to FIG. 7, it will be appreciated that due to the utilization of active modules and initialization, an L-shaped display 150 of active modules 152 will provide the required geometry.

Figure 8:
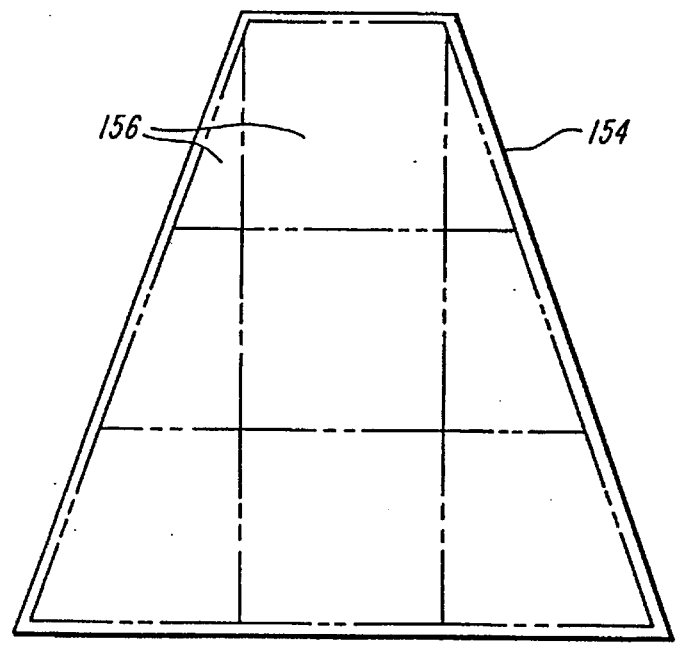
FIG. 8 is a diagrammatic representation of a trapezoidal display utilizing the active module approach in which the active module processing permits the reformatting and display of information across this geometrical surface.

Referring to FIG. 8, it will also be appreciated that the utilization of active modules can provide a trapezoidal display 154 with the appropriate images. Here modules 156 are the active modules in question.

With respect to the software organization for the active module system, software for the invention is organized into processes. A process is a copy of a compiled computer program, along with a copy of the data of that program, placed into execution on a module. The processor of the module is multiplexed among all of the processes on that module by means of software also in the memory of that module. A description of the concept of process can be found in any standard text on operating systems-for example, Andrew S. Tannenbaum, Modern Operating Systems, Prentice-Hall, 1992. Implementation of processes is well-known in the state of the art. By this means, each process has a rate of execution independent of all other processes on that module and of all processes on other modules.

Note that it is possible for more than one process on the same module or on different modules to be copied from the same computer program. Even though such processes are based on the same program, they may be doing different things because they will have received different input. This is an essential requirement for the software of the invention.

Any process can create another, new process by executing the operation "fork" in its program. The "fork" operation takes the name of some program to be copied and the name of the module on which the copy is to be made. It allocates space in the memory of that module for both the program and the data, makes the copy, and returns the name of the newly created process to the original process. When a process reaches the end of its program, it and its data are removed from the memory of the module and it no longer exists.

As to communication among processes, processes communicate and coordinate their activities with each other by sending messages. A message is a block of data sent by one process to another process. The format of the data is encoded in the programs of the two processes.

Each process has a message queue. The message queue for a particular process consists of all of the messages which have been sent by other processes to that process but which have not yet been acted upon by that process. It is organized by the order in which messages are received. There are three operations regarding messages which may be encoded in the program of a process:- check-for-message, get-message, and send-message.

check-for-message simply checks to determine whether or not there are messages in the message queue of the process. It returns a true or false indication.

get-message removes the first message from the message queue of the process and copies it into a designated data area of the process; the message itself is discarded.

If, however, the message queue is empty (i.e., if there are no messages from other processes), then get-message causes the process to suspend execution until a new message arrives. Thus, a process may synchronize its activities with another process by waiting for a message from that other process.

send-message creates a brand new message, copies data from a designated data area of the process, and adds the name of the sending process and receiving process. If the receiving process is on the same module, send-message then appends the newly created message to the end of the message queue of the receiving process. Furthermore, if the receiving process had previously suspended execution because get-message found an empty message queue, execution is resumed on the receiving process as a result of the arrival of the new message.

If the receiving process is not on the same module as the sending process, then send-message instead sends the message to a special process on its module called the forwarder. The forwarder process, operating by the flowchart shown in FIG. 9, first selects one of the links between modules, then transmits the message over that link to the forwarder process in the module at the other end of the link.

Figure 9:
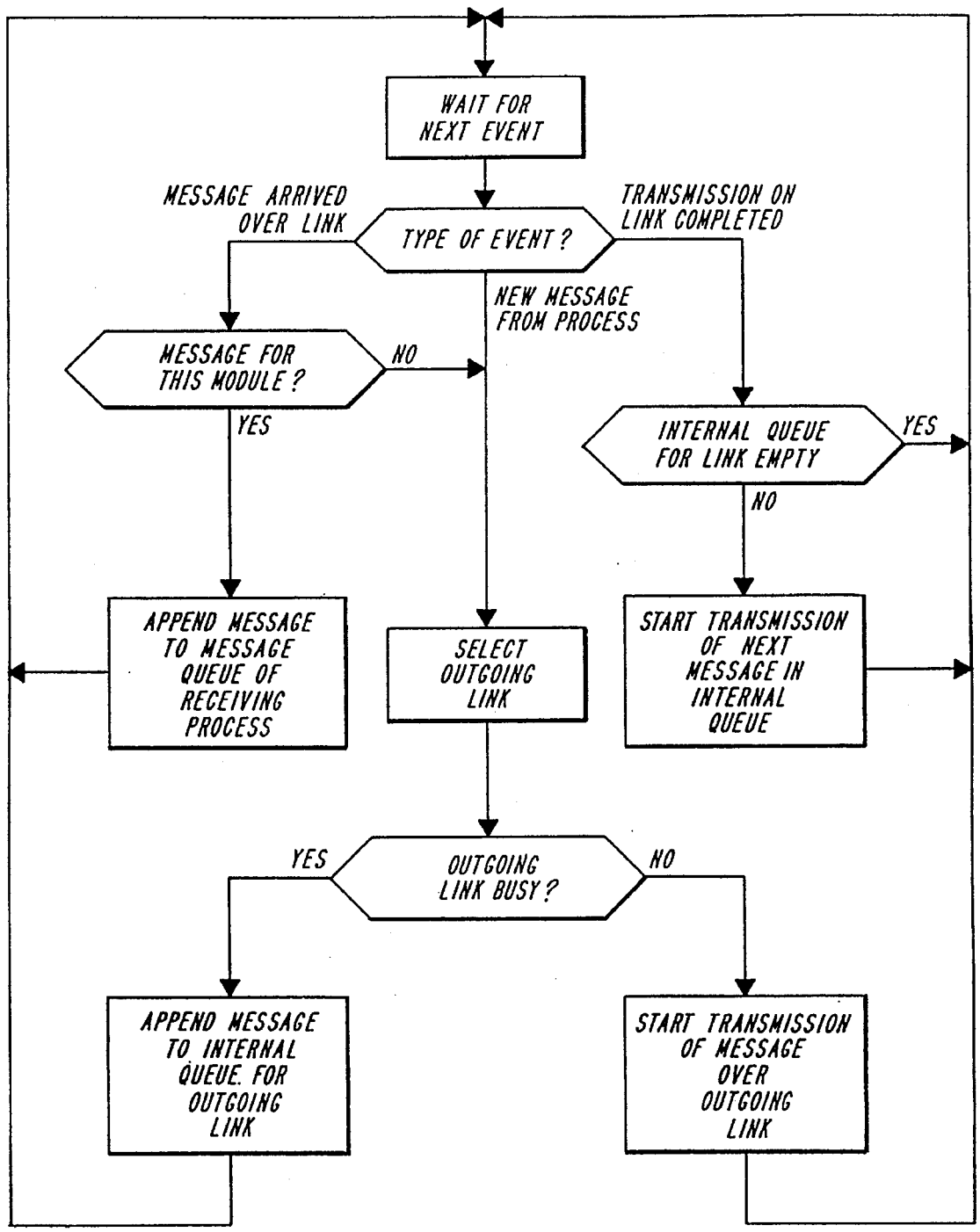
FIG. 9 is a flow chart of a typical forwarder process.

The set of forwarder processes, one per module, plus the set of links between modules, thus comprises a high performance "network" over which messages can flow between arbitrary processes on arbitrary modules as illustrated in FIG. 9. As to software Organization, in this embodiment of the invention, visual information in the form of structured data originates at generators of source material connected to a computer network. The information is transmitted to the invention via the network, where it is received by a network interface connected to one module in the invention. The structured data conforms to the X11 Protocol, a well-known format for representing visual information in computer systems as described by Robert Schleifler and James Gettys, X Window System, Third Edition, Digital Press, 1992 (ISBN 1-555558-088-2). The software on the invention translates information in the X11 Protocol into individual pixels for display. Such software is known in the art as an X11 Server as described by Susan Angebranndt and Todd Newman, "The Sample X11 Server Architecture," Digital Technical Journal, volume 2, number 3, pp. 16–23 (1990). In the prior art, X11 servers are typically organized as single processes running on single CPUs. Because this invention has a CPU for each module, the software is organized as as set of processes distributed across the set of modules. These processes have a collective responsibility for "drawing" or "painting" the information on the displays of the individual modules in such a way that the result across all modules forms a coherent whole from the perspective of a human viewer. An outline of the set of processes is shown in the diagram of FIG. 10.

Information in an X11 Server is organized by windows. A window is a region of the visible surface of the display which exists solely for the purpose of grouping visible objects and images. Each visible object on the display is contained within some window. The specification of that object in the X11 protocol always describes the object in relation to the boundaries of its containing window, independent of the position of that window on the display surface. In addition, windows may overlap, with one window obscuring part or all of another window.

Figure 10:
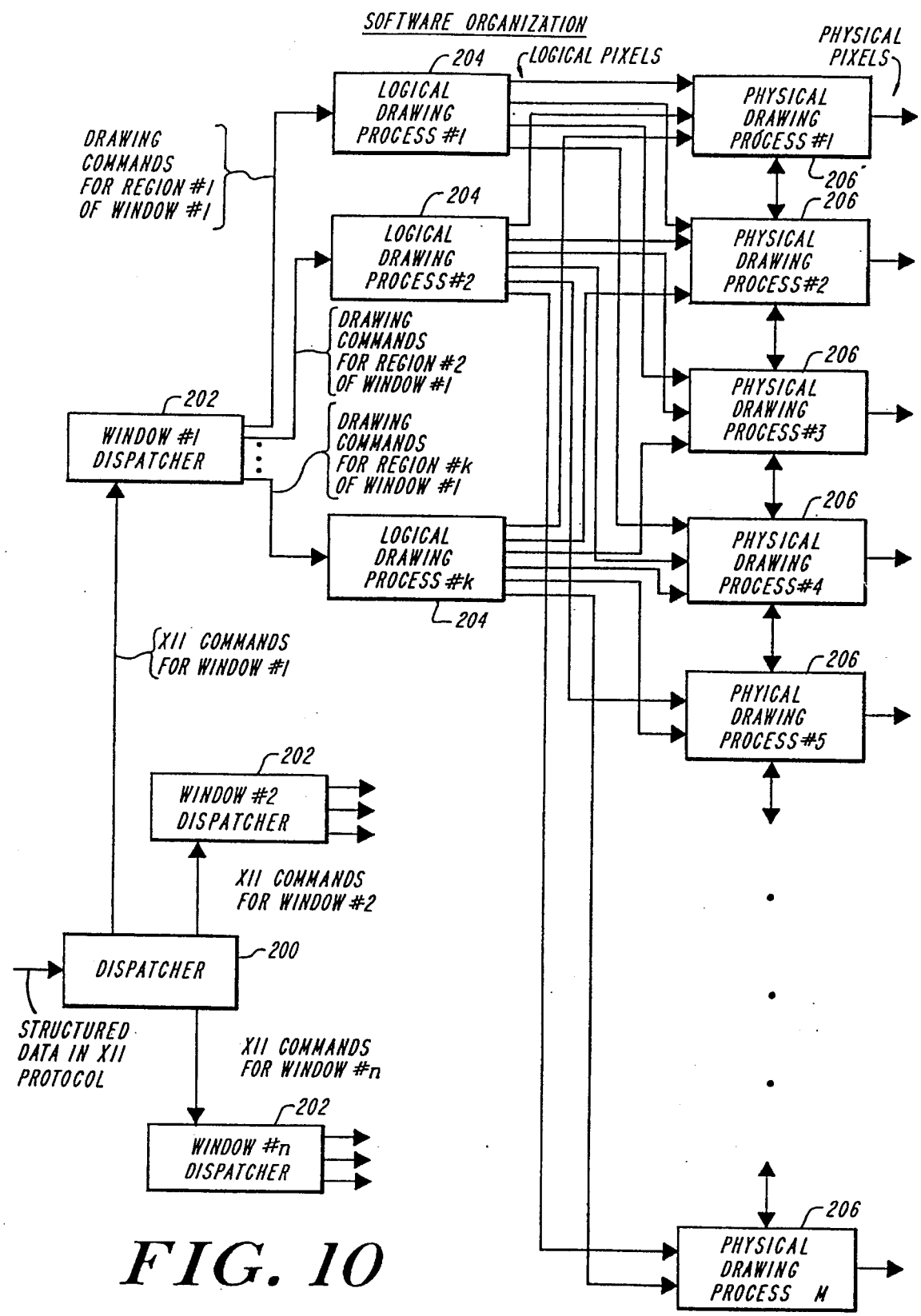
FIG. 10 is a diagram of software organization for use with active modules.

Referring to FIG. 10, in terms of processes run on modules, at the left edge of the chart is a Dispatcher process 200 number. This process is always assigned to the module containing or attached to the network interface. It's primary function is to receive structured data and to route to other processes on other modules in the format of the X11 Protocol from the network interface and either act on it itself or forward it to other processes for action. In particular, data describing a particular piece of information to be displayed at a particular position in a particular window (i.e., an X11 Command) is forwarded directly to the Window Dispatcher process for that window. (Such commands represent the vast majority of the data received by the Dispatcher process.)

data describing the creation of a new window is acted on by the Dispatcher itself. It forks a new Window Dispatcher process, assigning it to an appropriate module based on performance considerations. It then sends a message to the newly created process informing it of the position and relative size of the newly created window, along with information about other windows which might obscure its window.

data describing rearrangement, change of size, obscuring, or exposure of windows is translated by the Dispatcher into messages to each of the affected Window Dispatchers.

Note, each window is controlled by a separate Window Dispatcher process 201 running on a separate module. It is convenient but not necessary that Window Dispatchers be assigned to modules near to the location of their corresponding windows on the display surface. Each Window Dispatcher is responsible for the visual information in one window. The diagram shows n Window Dispatchers, but it elaborates only the first one.

Window Dispatchers operate in terms of logical pixels. A logical pixel is a spot of visible light on the surface of the display as seen by the viewer or operator. It may be implemented by one or more physical pixels—i.e., spots of light emitted by the display devices of the individual modules which, when combined, present the appearance of a single pixel to the viewer.

When a Window Dispatcher 201 process is created, it in turn creates a number of Logical Drawing processes 204—i.e., processes which convert X11 commands for a certain region of the window into logical pixels. The number of Logical Drawing processes is determined by the number of pixels covered by the window and the complexity of the visual information being presented in that window. The Window Dispatcher maintains statistics and other information about the kind and rate of commands received, and it may add Logical Drawing processes as necessary. It assigns Logical Drawings processes to modules nearest the location of the window, taking into account the presence of other Logical Drawing processes and other demands on the CPUs of the modules.

The Window Dispatcher maintains the following information about its window; it also shares this information with each of its Logical Drawing processes:

The scale of the window—i.e., the size of a point (i.e., a unit of measurement in the X11 Protocol) in logical pixels.

The size of the window in points, the unit of measurement in the X11 protocol.

The position of the window in logical pixels measured from the boundaries of the display.

The Logical Drawing processes do the actual work of converting the structured data of the X11 Protocol into logical pixels. By and large, the algorithms in the Logical Drawing process are well understood in the prior art. However, instead of writing logical pixels directly into framebuffer memories, as in conventional in the prior art, the Logical Drawing Processes send them to the Physical Drawing processes 206, described below.

The final group of processes, at the right edge of the diagram, are the Physical Drawing processes 206. There is exactly one of these per module, and it controls the frame buffer and registers controlling the display device of that module. The Physical Drawing process convert logical pixels into physical pixels under its control. If a particular logical pixel corresponds to more than one physical pixel in more than one module, then the Physical Drawing process sends copies of the logical pixel to the Physical Drawing processes in the other modules. This ensures that all of the physical pixels corresponding to a particular logical pixel are illuminated to the correct brightness and color.

In summary, as part of the conventional display functions, parameterized graphics operations can be transmitted. Below are some examples of such operations performed by the active modules:

For instance, Drawline (x1,y1,x2,y2,color) draws a line from display cartesian coordinates (x1,y1) to (x2,y2), with pixel color "color". For long lines, the parameter's (and thus the communication) cost is significantly less than for a series of pixel writes.

Other examples include DrawRectangle (x1,y1,x2,y2, color), where x1,y1) and x2,y2) are corners of the rectangle.

For other types of image processing, active modules can include sophisticated processor architecture for primitives capable of interpolating the intensity between two pixel values, thus to perform fast matrix operations for translation and rotation.

For unlimited flexibility, the modules can be arranged in any physical configuration. This, when combined with the unlimited scalability, provides for very large display configurations not possible in the prior art.

As to removing boundary effects, the modules of this invention can cooperate with each other so that visual artifacts are not introduced at the boundaries between modules. Each module coordinates the data near its boundary with the data of the neighbor just beyond that boundary.

Through the use of active modules for maintaining and updating large modular displays in real time, it is now possible to combine a number of small flat panel displays into a grid or array to effectively create one large one. This large modular display is now arrangeable in a number of different ways, for example, as a very wide desktop unit for improved productivity at an ordinary desk; as a wall-mounted electronic unit, as a white board; or as a surrounding display for supporting things like flight simulation or virtual reality applications.

The use of active modules thus provides a large real time, seamless display system, big enough to present the information of an application in a single field of view, rapidly updated, with enough resolution to display it as crisply as the eye requires, either flat or curved, and in spatial proportions required by the application. The use of active modules also permits displaying arbitrary mixtures of text, graphics, still images, video, animations and dynamic visualizations. Each object is scalable and capable of being positioned anywhere on the display to suit the needs of the user.

Further, with active modules as the building blocks of a system for display of images across a broad canvas, applications for such large electronic canvasses include presentation of large objects with detail, where it is necessary to show a complex object as a whole, and at the same time provide fine detail about its parts. Specific examples include electronic chip design, presentation of physical products like automobiles or airplanes, and display of maps. For paper based design systems, design rooms can be provided with giant wall-mounted blueprints which can be inspected from close range or viewed from afar. In this context, a very large display would desirably contain a high resolution representation of the overall design in the background, and provide scalable, movable windows to zoom into any appropriate subset or details.

Additionally, with active modules large electronic canvasses can be developed for control panel applications. Industrial systems such as power plants, rail, air, telephone, network and other traffic control centers and broadcast studios typically have large physical panels on which read-out devices and controls are arranged geometrically, often corresponding to the physical or logical topology of the the system being controlled. While these panels have a direct visual representation of the system under control, present panels are inflexible and expensive, hard to adapt to changing systems, and unable to show alternative to user topologies. A very large display application could alleviate some of these problems by showing the base view of the system, with separate windows showing relevant information or current activities. Unlike fixed panels, displays with active modules are not restricted in size, location, type of information, or content of information, but can appear anywhere appropriate for system control functions.

A third application for active module based large scale electronic canvasses is the area of visual databases. There is a present concern in the industry as to how to represent information from databases including how to represent visual information and the visual relationships among objects in the databases. Examples include key-frame indexes into movies. Spatial representation of temporal data such as audio tracks, and hypertext systems which show linkages among documents in an overview. In all of these, the principal idea is that the eye, rather than the hand, be used to switch between active regions of information. Conventional displays simply do not hold enough information to exploit these techniques; but a very large, high resolution display can accomplish these tasks.

Finally, in the area of presentation systems, a very large wall mounted display is extremely useful in modern seminar presentation rooms. With sufficient resolution, the display can replace the white board, slide and transparency projectors, and video systems all at once. The presenter could use a hand-held remote control device to manage the windows containing his slides, make copies of windows or snapshots of videos for auxiliary reference while he proceeds with the main part of the presentation. Using a so-called electronic chalk, the presenter could write on the display or annotate the information in window, with this information being preserved as the windows move. The scalability of windows would allow information to be sized to fit the audience rather than the focal length of the projector runs.

In summary, modular large screen displays which can require tens of minutes to display or "paint" an image are updated in real time through the use of active modules, each having its own display device, display driver, processor, memory and interfacing. Communication channels are provided between modules themselves as well as between the modules and the network interface that distributes the video source material in parallel to the modules.

The modular approach coupled with the use of active modules permits significant communication reduction that in turn permits real time image production across large areas due to the use of parallel data paths to the display memory distributed across the modules, and through the transmission of structured data, including compressed images, compressed video, sampled data and graphics primitives, permitted by the provision in each module of a processor which converts structured data to images in a local reconstruction process.

As a result, with displays exceeding 10 megapixels, maintaining the display and updating can be accomplished in at least two orders of magnitude less time when utilizing the active modules with their internal processing capabilities. Additionally, inter-module interconnects and communications achieve desired image format and manipulation to provide exceptional flexibility. This flexibility which includes the ability to physically arrange modules in any pattern, the ability to provide communication links between neighboring modules, and the ability to initialize modules with software agents. As a further result of using active modules to achieve increased speed or flexibility, computer processing power may be directed to those sections of the display which are actively addressed. Moreover, modules may be grouped and driven with a single video bus, with the video material being distributed between the modules of the group. This reduces bus requirements because of the internal processing and routing capabilities of the module. As an additional feature, the active modules may be initialized by software agents, with formatting and other display parameters being automatic regardless of original format or pixel density.

With so-called "active" or "smart" modules, updating a display panel of 2 ft. high by 6 ft. long can be accomplished, rather than in 24 minutes, in a matter of less than a second, i.e., real time. This being the case, it will be apparent that providing active or smart modules as opposed to passive modules, provides the ability to paint images on large scale displays at a rate heretofore not considered possible. Moreover, original images may be painted onto displays of differing geometries or shapes such as L-shaped, trapezoidal or circular, with the active modules performing the processing necessary to convert original material to these formats.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for driving a megapixel modular display in real time comprising:

means including a video source and a data bus between said source and said megapixel display for generating a structured data stream having a reduced data set responsible for specifying the image to be displayed and for coupling said structured data stream to said data bus;

a number of adjacent active modules each making up a portion of said display and having internal processing units therein;

means for driving preselected one of said active modules with said structured data stream;

means including a bus structure coupled to said preselected active module for providing communication in parallel between said preselected active module and the other of said active modules specifying the image to be displayed by a module, said modules having means for processing said structured data in parallel to provide the entire image across said display in real time; and means within each module for converting said structured data to logical pixels and then to real pixels, whereby image processing power can be allocated amongst said active modules, and whereby bandwidth restrictions on said data bus are alleviated.

* * * * *